US011454423B1

(12) United States Patent
Huzyak et al.

(10) Patent No.: US 11,454,423 B1
(45) Date of Patent: Sep. 27, 2022

(54) GROUND SCREW ADAPTOR FOR SOLAR PANEL SUPPORT STRUCTURE

(71) Applicant: Northern States Metals Corporation, Youngstown, OH (US)

(72) Inventors: Gregory Paul Huzyak, Salem, OH (US); Nancy Elaine Schubert, New Springfield, OH (US)

(73) Assignee: NORTHERN STATES METALS COMPANY, Youngstown, OH (US)

( * ) Notice: Subject to any disclaimer, the term of this patent is extended or adjusted under 35 U.S.C. 154(b) by 0 days.

(21) Appl. No.: 17/218,899

(22) Filed: Mar. 31, 2021

(51) Int. Cl.
*F24S 25/617* (2018.01)
*F24S 25/12* (2018.01)
*F24S 25/65* (2018.01)

(52) U.S. Cl.
CPC ............ *F24S 25/617* (2018.05); *F24S 25/12* (2018.05); *F24S 25/65* (2018.05); *Y02E 10/47* (2013.01)

(58) Field of Classification Search
CPC .......... F24S 25/617; F24S 25/12; F24S 25/65; F24S 25/70; Y02E 10/47; E04H 12/2215; E04H 12/2253; H02S 20/10; H02S 20/00; E02D 5/801; E02D 5/56; E02D 5/80
USPC ............................ 52/155–157, 160, 161, 165
See application file for complete search history.

(56) References Cited

U.S. PATENT DOCUMENTS 3,698,144 A * 10/1972 Stratton ............... E04H 12/2223
52/99
9,523,517 B2 * 12/2016 Warpup .................. F24S 25/10
9,556,581 B2 1/2017 Hale et al.
10,077,893 B1 * 9/2018 Abraham ............. E04H 12/2253
2011/0036026 A1 * 2/2011 Lee ..................... E04H 12/2223
52/157
2011/0163051 A1 * 7/2011 Horanek ................. F24S 25/13
211/26
2013/0256246 A1 * 10/2013 Tagliamonte ........... H02S 20/30
211/41.1

(Continued)

FOREIGN PATENT DOCUMENTS

CN 107355188 A * 11/2017 ............... E02D 5/56
JP 2014206027 A * 10/2014 ............ F24S 25/617

OTHER PUBLICATIONS

"http://www.terrafix.com/index/php/ground-anchoring-bolts.html", terrafix steel structures international GmbH, Copyright 2015, 2 pages.

*Primary Examiner* — Brian D Mattei
*Assistant Examiner* — Omar F Hijaz
(74) *Attorney, Agent, or Firm* — BakerHostetler

(57) ABSTRACT

An adaptor for connecting a ground screw to an upright beam of a solar panel support assembly includes (a) a cylindrical connector having an open ground-screw receiving bottom end and a top end, the cylindrical connector having an inner circumferential surface with a diameter slightly larger than that of the ground screw and at least two sets of bolt holes, each set of bolt holes including at least three bolt holes uniformly distributed circumferentially about the cylindrical connector at an axial level, and the at least two sets of bolt holes being axially distanced from one another; (b) an intermediate plate having a top surface and a bottom surface fixed to the top end of the cylindrical connector; and (c) an upright beam connector fixed to the top surface of the intermediate plate and extending upward from the intermediate plate.

12 Claims, 4 Drawing Sheets

(56) References Cited

U.S. PATENT DOCUMENTS

| | | | |
|---|---|---|---|
| 2014/0252195 A1* | 9/2014 | Maresca | F24S 25/12 248/371 |
| 2015/0191886 A1* | 7/2015 | Okobi | E02D 5/801 52/157 |
| 2015/0247336 A1* | 9/2015 | Bergman | E02D 27/42 52/157 |

* cited by examiner

GROUND SCREW ADAPTOR FOR SOLAR PANEL SUPPORT STRUCTURE

BACKGROUND

Modern solar panel systems provide photovoltaic or other sunlight receiving panels (such as mirrors for solar-thermal systems) supported on assemblies to receive and convert solar energy. The solar panels are typically large, relatively heavy, rectangular and planar panels. Most solar panel systems support multiple solar panels with solar panel support assemblies.

Fixed tilt system support assemblies support the solar panels at a fixed angle selected to have an optimum exposure to sunlight.

Solar tracking system support assemblies rotate solar panels to track the motion of the sun over the course of the day. Horizontal, single-axis solar trackers are often the most cost effective, as such trackers can simply rotate solar panels to face from east to west, to track the sun over the course of the day. Then at night, they can return to the stow position to repeat this standard cycle starting the following day.

Dual-axis trackers are also used to provide the tracking function for photovoltaic panels. The dual-axis trackers share the basic tracking function for east-west with the single-axis trackers. In addition to the east-west tracking function, a dual-axis tracker can also add some adjustment in the north-south direction. This allows the dual-axis tracker to more closely follow the position of the sun throughout the year and better adjust for Latitude and season. The single-axis tracker may be considered as a subset of the dual-axis tracker function and configuration. The dual-axis tracker includes the function of the single-axis tracker plus it has another degree of freedom to adjust the north-south angle and more closely track the sun for greater energy capture.

Such solar panel support assemblies experience significant mechanical stress due to weight, terrain, wind-loading, thermal expansion and other weather- or terrain-related events.

Many solar panel support assemblies are built on piers that are anchored to the ground or to some other surface. For those piers that are anchored to the ground, ground screws may be used as the anchor.

SUMMARY

Embodiments of the current disclosure provide novel ground screw adaptors for connecting upright beams of a solar panel support structure (or a similar framework) to anchored ground screws (or to some other anchor), and associated method for use/installation.

An aspect of the current disclosure provides an adaptor for connecting a ground screw to an upright beam of a solar panel support assembly. Such adaptor includes (a) a cylindrical connector having an open ground-screw receiving bottom end and a top end, the cylindrical connector having an inner circumferential surface with a diameter slightly larger than that of the ground screw and at least two sets of bolt holes, each set of bolt holes including at least three bolt holes uniformly distributed circumferentially about the cylindrical connector at an axial level, and the at least two sets of bolt holes being axially distanced from one another; (b) an intermediate plate having a top surface and a bottom surface fixed to the top end of the cylindrical connector; and (c) an upright beam connector fixed to the top surface of the intermediate plate and extending upward from the intermediate plate. In a more detailed embodiment, each set of bolt holes includes three bolt holes distributed 120° apart about the circumference of the cylindrical connector. In a further detailed embodiment, the adaptor includes two sets of the bolt holes axially separated at least about 2 or 3 inches apart, and in a specific embodiment are separated about 5 inches apart.

Alternatively, or in addition, the cylindrical connector, the intermediate plate and upright beam connector are welded together. Alternatively, or in addition, the upright beam connector includes a box-channel bracket extending from the intermediate plate and including a plurality of bolt holes.

In another aspect, an adaptor for connecting an anchor to an upright beam of a racking assembly subject to upward forces, downward forces and moment forces, includes: (a) a hollow connector having an open anchor receiving bottom end and a top end, the hollow connector having an inner surface that is shaped complementary to an outer surface of the anchor with dimensions slightly larger than that of anchor so that the anchor may be received in the bottom end of the hollow connector in a telescoping fashion, and at least two sets of bolt holes, each set of bolt holes including at least three bolt holes uniformly distributed about a perimeter of the hollow connector at an axial level, and the at least two sets of bolt holes being axially distanced from one another; (b) an intermediate plate having a top surface and a bottom surface fixed to the top end of the hollow connector; and (c) an upright beam connector fixed to the top surface of the intermediate plate and extending upward from the intermediate plate. In a more detailed embodiment, each set of bolt holes includes three bolt holes distributed 120° apart about the perimeter of the hollow connector. In a further detailed embodiment, the adaptor includes two sets of the bolt holes axially separated at least about 2 or 3 inches apart, and in a specific embodiment are separated about 5 inches apart.

In another aspect, a method for mounting an upright beam of a of a solar panel support assembly to an anchored ground screw is provided that includes steps of (in no specific order unless otherwise required): (1) providing an adaptor including (a) a hollow connector having an open anchor receiving bottom end and a top end, the hollow connector having an inner surface that is shaped complementary to an outer surface of the anchor with dimensions slightly larger than that of anchor so that the anchor may be received in the bottom end of the hollow connector in a telescoping fashion, and at least two sets of bolt holes, each set of bolt holes including at least three bolt holes uniformly distributed about a perimeter the hollow connector at an axial level, and the at least two sets of bolt holes being axially distanced from one another, (b) an intermediate plate having a top surface and a bottom surface fixed to the top end of the hollow connector, and (c) an upright beam connector fixed to the top surface of the intermediate plate and extending upward from the intermediate plate; (2) telescoping the hollow connector over the anchor such that the intermediate plate rests on a top surface of the anchor; (3) tightening set screws in the two sets of bolt holes such that the set screws provide frictional force against the outer surface of the anchor; and (4) coupling an upright beam of the solar panel support assembly to the upright beam connector. In a detailed embodiment the method further includes a step of (4) assembling the solar panel support assembly to the coupled upright beam; and following the assembling step, (5) torqueing at least some of the set screws further against the outer surface of the anchor. In a further detailed embodiment, the torqueing step (5) causes mechanical deformation of the outer surface of the anchor.

Alternatively, or in addition, each set of bolt holes includes three bolt holes distributed 120° apart about the circumference of the hollow connector. Alternatively, or in addition, the adaptor includes two sets of the bolt holes axially separated at least about 2 or 3 inches apart, and in a specific embodiment are separated about 5 inches apart. Alternatively, or in addition, the hollow connector, the intermediate plate and upright beam connector are welded together. Alternatively, or in addition, the upright beam connector includes a box-channel bracket extending from the intermediate plate and including a plurality of bolt holes; and the step (4) of coupling an upright beam of the solar panel support assembly to the upright beam connector includes a step of (4a) telescoping a box-channel upright beam with respect to the box-channel bracket and coupling the box-channel upright beam to the upright beam connector with multiple bolts and nuts. In a more detailed embodiment, the step (4a) of telescoping the hollow connector over the anchor such that the intermediate plate rests on a top surface of the anchor includes a step of (4b) orienting the box-channel bracket such that a middle plate of the box-channel bracket is substantially parallel to a north-south direction. Alternatively, or in addition, the inner surface of the hollow connector is dimensioned at least about ¼ inches larger than that of anchor and the method includes a step of gimballing hollow connector with respect to the anchor using spacing provided by the different dimensions. In a more detailed embodiment, the anchor and hollow connector are cylindrical and the inner surface of the hollow connector has a diameter that is at least about ¼ inches larger than the diameter of the anchor and the method includes a step of gimballing hollow connector with respect to the anchor using spacing provided by the different diameters.

These and other aspects and objects of the current disclosure will be apparent from the following description, the appended claims and the attached drawings.

DETAILED DESCRIPTION

Figure 1:
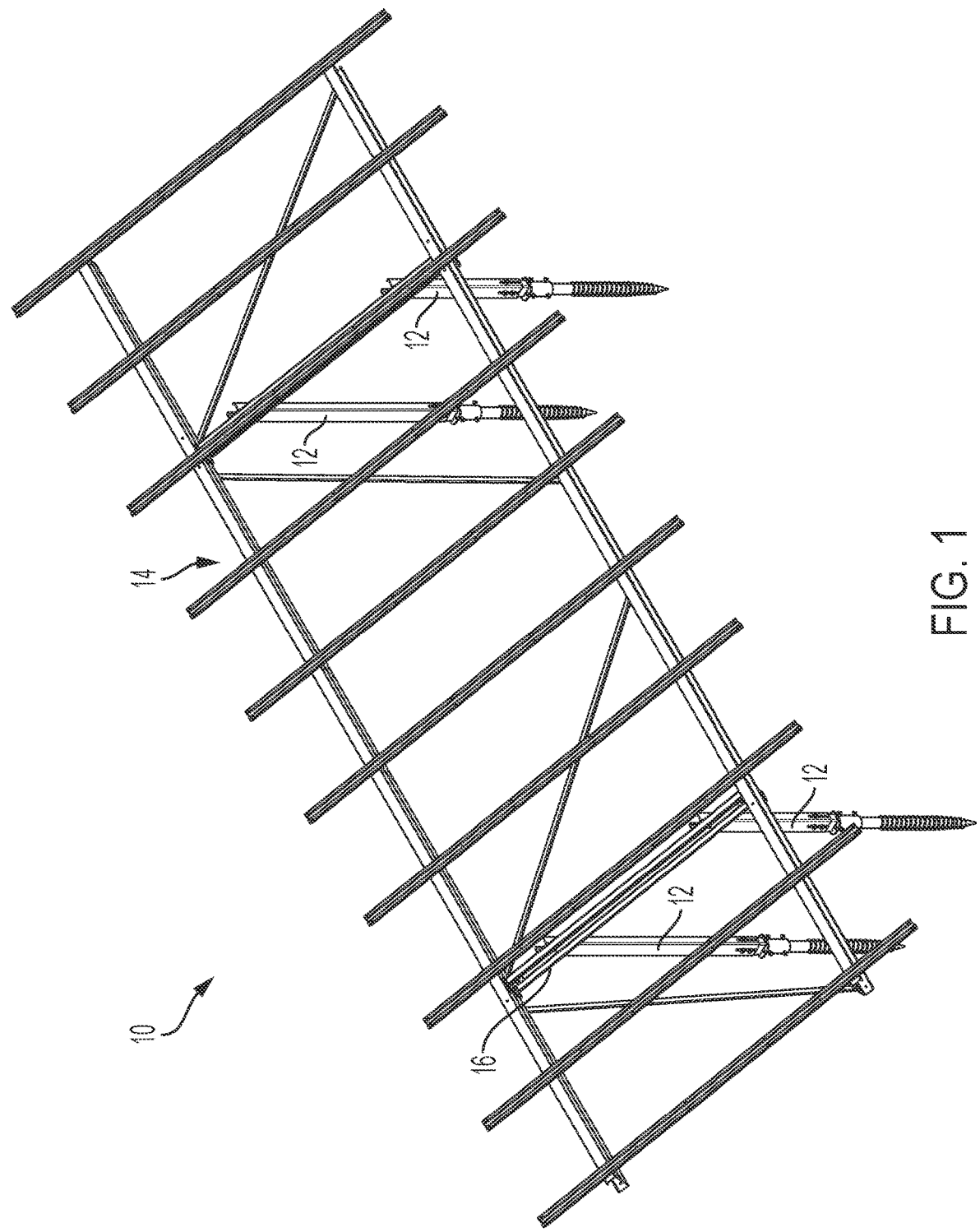
FIG. 1 provides a perspective view of an exemplary solar panel support structure.

FIG. 1 provides a perspective view of a fixed tilt system support assembly 10 for supporting solar panels at a fixed angle selected to have an optimum exposure to sunlight. Typically, this fixed angle would be directed towards the equator (so that the solar panels have optimum exposure to sunlight). The fixed tilt solar panel support assembly 10 includes a plurality of vertical piers or posts 12 which support a racking framework 14 onto which solar panels (not shown) are mounted. While the exemplary embodiments discussed herein pertain to a fixed tilt system, it will be apparent to those of ordinary skill that the disclosure is also relevant to solar tracking systems, other solar panel support framework assemblies, as well as other large framework assemblies subject to the same sorts of mechanical stresses (uplift forces, downward forces and moment transfer) discussed herein.

Figure 2:
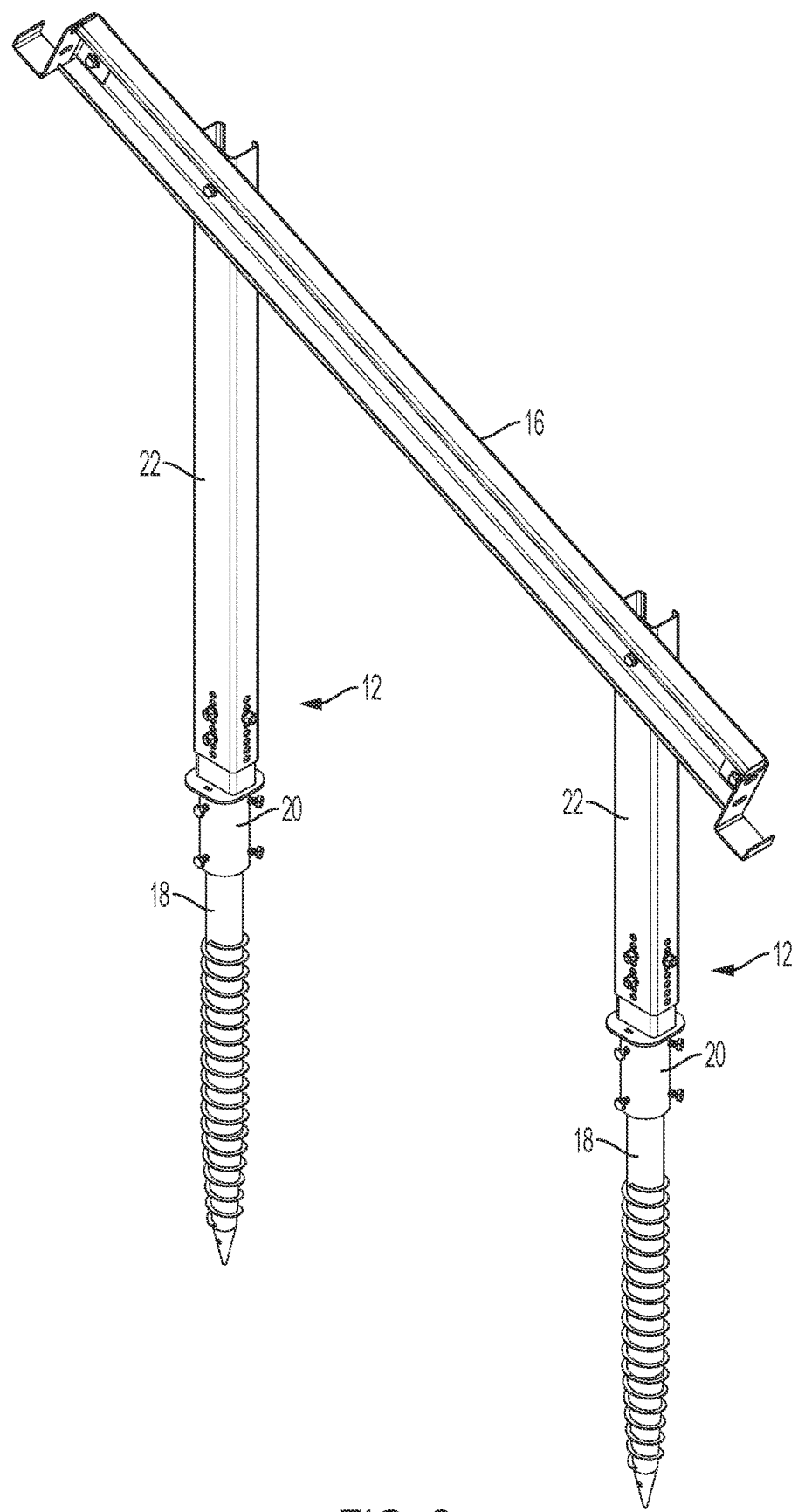
FIG. 2 provides a close-up view of the exemplary support structure of FIG. 1, including exemplary ground screw adaptors connecting the support structure to ground screws.

FIG. 2 is a perspective, close-up view of a pair of the vertical support posts/piers 12 supporting and being coupled to a tilted beam 16 of the tilt system solar panel support assembly framework 14. Each of the vertical support posts/piers 12 include a ground screw 18 anchored into the ground (screwed, or otherwise embedded into the ground) and adapter assembly 20 mounted on a top end of the ground screw 18 and a box channel upright beam 22 mounted to the top end of the adapter assembly 20. The tilted beam 16 is in turn mounted to the top end of the box channel upright beams 22 as shown in FIG. 2.

Figure 3:
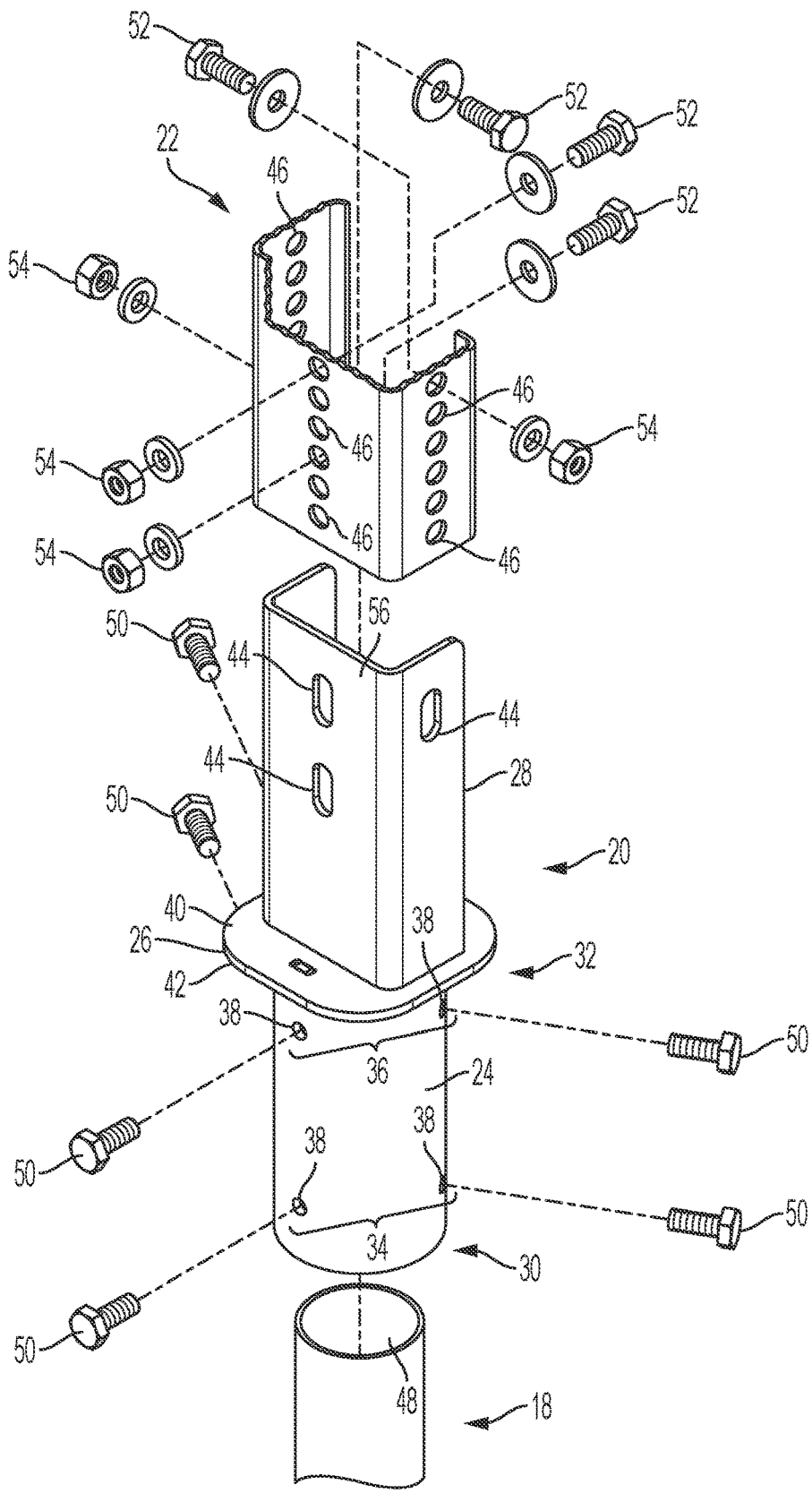
FIG. 3 perspective, exploded view of an exemplary ground screw adaptor for connecting a vertical support of a solar panel support structure to a ground screw.
Figure 4:
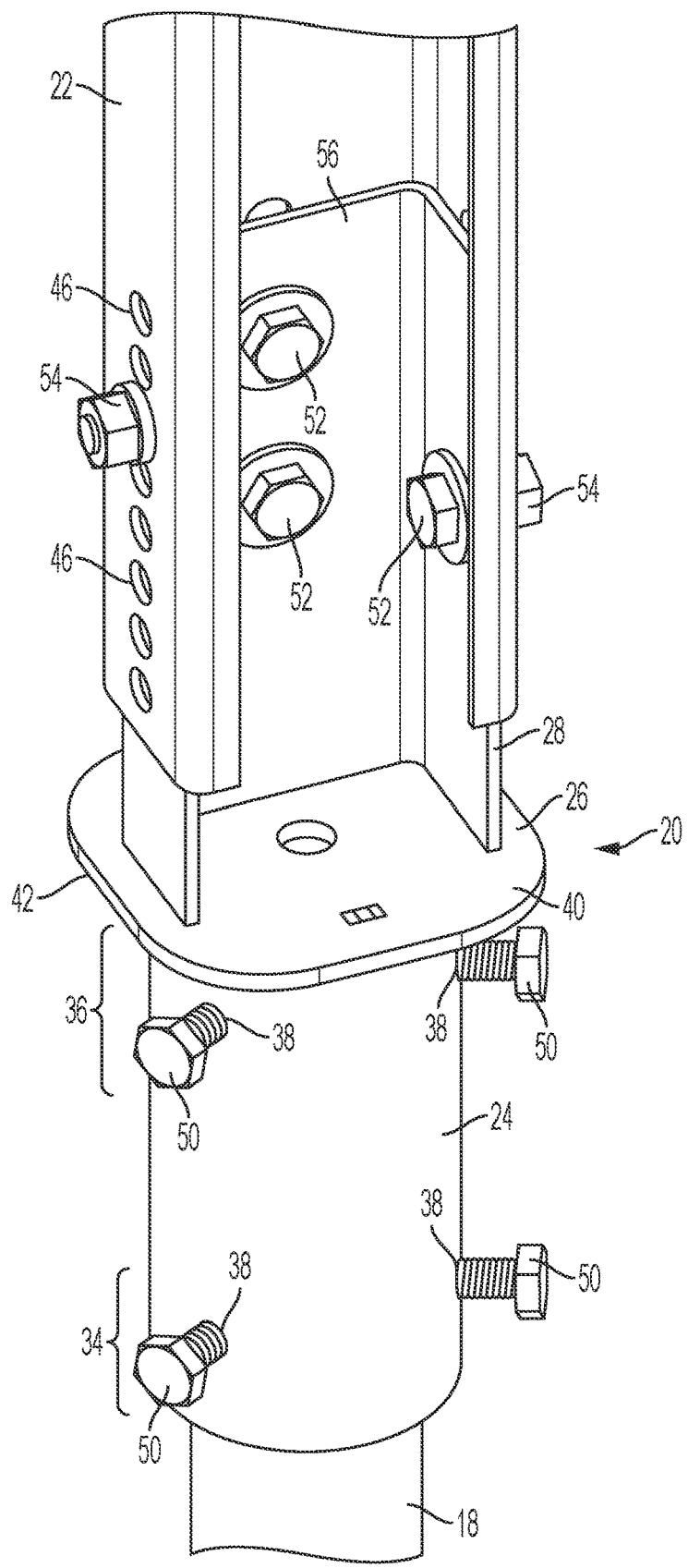
FIG. 4 is an assembled view of FIG. 3 shown from an opposite perspective.

FIGS. 3 and 4 provide details of the adapter assembly 20 and how the adapter assembly 20 mounts the upright beams 22 over the ground screws 18. FIG. 3 is an exploded view illustrating this coupling while FIG. 4 is a close-up perspective view of the coupling provided by the adapter 20. The adapter 20 for connecting the ground screw 18 to a vertical upright beam 22 of the solar panel support assembly includes a cylindrical connector 24, an intermediate plate 26 and an elongated upright beam connector 28. The hollow cylindrical connector 24 has an open ground screw receiving bottom end 30 and a top end 32. The cylindrical connector 24 has an inner circumferential surface (not shown) with a diameter that is larger than that of the ground screw 18 so that the cylindrical connector 24 can be received over the top end of the ground screw 18 in a telescoping fashion. The cylindrical connector 24 includes at least two sets 34, 36 of bolt holes 38 where each set 34, 36 of bolt holes 38 include at least three of such bolt holes 38 uniformly distributed circumferentially about the cylindrical connector 24 at a given axial level such that the lower set 34 of bolt holes 38 is axially distanced from the upper set 36 of bolt holes 38. In an exemplary embodiment, each set 34, 36 of bolt holes 38 includes three of such bolt holes 38 distributed 120° apart about the circumference of the cylindrical connector. In an embodiment, these two sets 34, 36 of bolt holes 38 are axially separated from each other by at least two or three inches and are separated by about 5 inches in the specific embodiment illustrated. In other embodiments, the axial separation of the two sets 34, 36 of bolt holes 38 may be 6 inches, 8 inches or even more. As will be appreciated, the greater the axial separation, the greater the assembly will be able to withstand uplift and moment forces on the structure.

In a specific embodiment, the cylindrical connector 24 has an inner circumferential surface (not shown) that is about 3.5 inches, while outer diameter of the ground screw 18 at its top end (the portion that mates in a telescoping fashion with the cylindrical connector 24) has an outer diameter of about 3 inches. This difference in diameters leaves about ¼ inch radial separation between the cylindrical connector 24 and the cylindrical top end of the ground screw 18 when the cylindrical connector 24 and the ground screw are coaxial. This diametrical/radial separation permits gimballing or rotational capacity for making the uprights plumb as will be described further below.

The intermediate plate 26 may be welded onto the top end 32 of the cylindrical connector 24. The intermediate plate 26 has a top surface 40 and a corresponding bottom surface 42 where the bottom surface may be welded to the top of the cylindrical connector 24 and the top surface 40 may be welded to the upright beam connector 28. While the intermediate plate 26 is welded to the cylindrical connector 24 and upright beam connector 28 in an exemplary embodiment, it will be apparent to those of ordinary skill that the intermediate plate 26 may be integrally connected, fixed or securely coupled to either or both of the cylindrical connector 24 and upright beam connector 28 in other embodiments.

The upright beam connector 28 welded to the top surface 40 of the intermediate plate 26 extends upward from the intermediate plate 26. In an exemplary embodiment, the upright beam connector 28 is in the form of a Box-channel configured to engage with a corresponding Box-channel structure of the upright beam 22. In the exemplary embodiment, the upright beam connector 28 includes a plurality of bolt holes 44 positioned to be aligned with a selected plurality of bolt holes 46 in the Box-channel upright 22. The upright beam connector 28 and the upright 22 may be coupled to each other with corresponding bolts 52 and nuts 54, where the bolts 52 extend through aligned bolt holes 44, 46.

It will be apparent to those of ordinary skill that the upright beam connector 28 connector may be designed in other embodiments to mate with and couple to different designs of upright beams as known in the art (or as become available in the art). Similarly, it will be apparent to those of ordinary skill that the cylindrical connector 24 may be a hollow connector (with an open bottom) having a different internal shape to match and telescope of a complementary shaped ground screw top end (for example, and without limitation, octagonal shapes, rectangular/square shapes, oval shapes, star shapes and the like). Similarly, it is within the scope of the current disclosure that the telescoping engagement between the cylindrical connector 24 and the top end of the ground screw 18 be swapped, while still maintaining many of the advantages of the illustrated embodiment. For example, it will be appreciated that the cylindrical connector 24 may be a cylinder (or alternate shape) that telescopes within a cylindrical (or alternate shaped) hollow top end of the ground screw 18, where the ground screw contains the two sets 34, 36 of bolt holes rather than the cylindrical connector.

An example process for installing the vertical uprights 22 to the ground screw 18 that has been securely anchored into a ground surface is as follows: First, place the ground screw adapter 20 over the cylindrical top end of the installed ground screw 18 in a telescoping fashion such that the intermediate plate 26 of the adapter 20 is resting on the top surface 48 of the ground screw 18 and that the box-channel middle plate 56 of the upright beam connector 28 is oriented parallel to the north/south direction. Next, set bolts 50 are placed through the bolt holes 38 of the cylindrical connector 24 such that all six set bolts 50 are in firm contact with the outer cylindrical surface of the ground screw 18 and that the adapter 20 is plumb in all directions. Plumbing the adapter 20 can be achieved by adjusting the set bolts 50 to varying depths to account for gimballing the adaptors 24 with respect to ground screw installations that may be out-of-plumb. The set bolts 50 need only be finger-tight at this time. With the adapters 20 in place, installation of the upright beams 22 occurs next. The upright beams 22 are installed by sliding/telescoping the Box-channel of the upright beam 22 over top of the Box-channel portion of the upright beam connector 28. The uprights 22 are thereafter adjusted vertically as needed to permit alignment of the upper racking structure 14 and then bolts/nuts 52, 54 are installed fastening the upright 22 to the upright beam connector 28. Next, racking 14 construction occurs After the racking structure 14 is erected and aligned, the set bolts 50 are torqued such that they may be sufficiently friction fit and/or embedded into the cylindrical surface of the ground screw 18 (in an embodiment, the bolts 50 are torqued sufficiently so that they begin to mechanically deform outer circumferential surface of the ground screw).

Some features and benefits of the exemplary adapter assembly 20 include, for example, simple installation. Racking can be constructed before final plumbing and tightening of the adapters. Further, no special fabrication is needed on the ground screw. In an embodiment, the upright beam connector 28 eliminate the need for East/West and North/South bracing (up to approximately 90 psf snow, 130 mph wind in an embodiment depending upon tilt angle and panel size). The exemplary embodiment allows for +/_3.5% out-of-plumb tolerance for ground screw installation. The exemplary embodiment allows for unlimited rotational tolerance for screw installation. The exemplary embodiment allows for several inches of vertical adjustment permitted at the connector 28 to upright 22 connection. The six-bolt set screw type connection used by the exemplary adapter provides secure connection from adapter 20 to ground screw 18. The bolts 50 may be provided pre-installed in the adapter 20 in tapped holes 38. The set bolts 50 may be standard hardware and require no special tools. Further, the intermediate plate 26 of the adapter 20 rests atop the ground screw top surface 48 providing no concern for slipping over time.

The intermediate plate 26 allows for transition from ground screw to box channel upright as discussed above. This also eliminates risk of slip by providing a hard stop over the ground screw 18. The cylindrical connector 24 envelopes the top of the ground screw 18 and is secured with six set bolts 50. In the exemplary embodiment, this permits 3.5° of rotation with respect to plumb and unlimited twist adjustment about the ground screw 18.

The telescoping upright beam connector 28 allows several inches of total vertical adjustment of about +/−2.5 inches in the illustrated embodiment; but it will be appreciated that different (unlimited) vertical adjustment capabilities of the upright beam connector 28 will depend upon the type, shape and design of the vertical upright 22 to which the upright beam connector 28 is adapted to be connected.

The box channel uprights used for the vertical uprights 22 may be made from pre-galvanized material and potentially roll-formed for high volume production.

The adapter assembly 20, according to the exemplary embodiments, is beneficial to allow the racking construction 14 to withstand multiple types of forces. Uplift forces (caused by wind, for example) are resisted between the ground screw 18 and the adaptor 20 due to the telescoping connection between the ground screw 18 and the adaptor secured by two vertically separated sets 34, 36 of three set bolts 50 spaced 120° about the circumference of the ground screw. When uplift forces in the installed vertical upright 22 pull on the adaptor vertically, the set bolts 50 resist the uplift forces through friction. If loaded heavily enough, the set bolts 50 will begin to plow the ground screw material. Downward forces are resisted by way of the intermediate plate 26 of the adaptor 20 resting on the top surface 48 of the ground screw. In this case, there is no reliance on the set bolts 50 to resist forces acting in a downward direction on the connection. Moment transfer forces are resisted between the ground screw 18 and the adaptor 20 due to the telescoping connection between the ground screw 18 and the adaptor secured by two vertically separated sets 34, 36 of three set bolts 50 spaced 120° about the circumference of the ground screw. Prior art ground screw-to-post connection rely on just three set bolts (one vertical level), which permits the telescoping round post to pivot within the ground screw because the connection has a near-zero "development length."

Because the exemplary adaptor 20 has two vertically separated sets 34, 36 of set bolts 50 spaced sufficiently far apart, the connection has greater development length, which enables the connection to adequately transfer bending moments from the vertical uprights 22 to the ground screw foundation.

Having described the embodiments of the current disclosure with reference to the above specification and the attached drawings, it will be apparent to those of ordinary skill that modifications may be made without departing from the scope of the disclosed inventions as defined by the following claims. Further it is not intended that any details of the above disclosure be incorporated into the meaning of the claims unless specifically set forth in the language of the claims.

What is claimed is:

1. An adaptor for connecting a ground screw to an upright beam of a solar panel support assembly, comprising:
   a cylindrical connector having an open ground-screw receiving bottom end and a top end, the cylindrical connector having an inner circumferential surface with a diameter slightly larger than that of a ground screw and at least two sets of bolt holes, each set of bolt holes including at least three bolt holes uniformly distributed circumferentially about the cylindrical connector at an axial level, and the at least two sets of bolt holes being axially distanced from one another, and positioned to align with a continuous portion of a cylindrical top end of the ground screw when the adaptor is installed in a telescoping fashion over the cylindrical top end of the ground screw;
   an intermediate plate having a top surface and a bottom surface fixed to the top end of the cylindrical connector; and
   an upright beam connector fixed to the top surface of the intermediate plate and extending upward from the intermediate plate;
   whereby the at least two sets of bolt holes being axially distanced from one another causes a connection between the adaptor and a ground screw to have greater development length, which enables the connection to adequately transfer bending moments from an upright beam connected to the upright beam connector to the ground screw; and
   wherein the inner circumferential surface of the cylindrical connector has a diameter that is about ½ inches larger than an outer diameter of the ground screw; thereby permitting gimballing for making an upright beam connected to the upright beam connector plumb during installation.

2. The adaptor of claim 1, wherein each set of bolt holes includes three bolt holes distributed 120° apart about the circumference of the cylindrical connector.

3. The adaptor of claim 2, wherein the at least two sets of the bolt holes are axially distanced from one another by at least about 3 inches.

4. The adaptor of claim 3, wherein the at least two sets of bolt holes are axially distanced from one another by at least about 5 inches.

5. The adaptor of claim 1, wherein the cylindrical connector, the intermediate plate and upright beam connector are welded together.

6. The adaptor of claim 1, wherein the upright beam connector includes a box-channel bracket extending from the intermediate plate and including a plurality of bolt holes.

7. An adaptor for connecting an anchor to an upright beam of a racking assembly subject to upward forces, downward forces and moment forces, comprising:
   a hollow connector having an open anchor receiving bottom end and a top end, the hollow connector having an inner surface that is shaped complementary to an outer surface of the anchor with dimensions slightly larger than that of anchor so that the anchor may be received in the bottom end of the hollow connector in a telescoping fashion, and at least two sets of bolt holes, each set of bolt holes including at least three bolt holes uniformly distributed about a perimeter of the hollow connector at an axial level, and the at least two sets of bolt holes being axially distanced from one another and positioned to align with a continuous portion of the top end of the anchor when the adaptor is installed in a telescoping fashion over the top end of the anchor;
   an intermediate plate having a top surface and a bottom surface fixed to the top end of the hollow connector; and
   an upright beam connector fixed to the top surface of the intermediate plate and extending upward from the intermediate plate;
   whereby the at least two sets of bolt holes being axially distanced from one another causes a connection between the adaptor and an anchor to have greater development length, which enables the connection to adequately transfer bending moments from an upright beam connected to the upright beam connector to the anchor; and
   wherein an inner surface of the hollow connector has a diameter that is about ½ inches larger than a diameter of an outer surface of the anchor; thereby permitting gimballing for making an upright beam connected to the upright beam connector plumb during installation.

8. The adaptor of claim 7, wherein each set of bolt holes includes three bolt holes distributed 120° apart about the perimeter of the hollow connector.

9. The adaptor of claim 8, wherein the at least two sets of the bolt holes are axially distanced from one another by at least about 3 inches.

10. The adaptor of claim 9, wherein the at least two sets of bolt holes are axially distanced from one another by at least about 5 inches.

11. The adaptor of claim 7, wherein the hollow connector, the intermediate plate and upright beam connector are welded together.

12. The adaptor of claim 7, wherein the upright beam connector includes a box-channel bracket extending from the intermediate plate and including a plurality of bolt holes.

* * * * *